US011068968B2

United States Patent
Kuoh et al.

(10) Patent No.: US 11,068,968 B2
(45) Date of Patent: Jul. 20, 2021

(54) AUGMENTED REALITY DEVICE AND METHOD FOR PRODUCT PURCHASE FACILITATION

(71) Applicant: Mastercard Asia/Pacific Pte. Ltd., Singapore (SG)

(72) Inventors: Veronica Kuoh, Singapore (SG); Benjamin Charles Gilbey, Singapore (SG); Eric Jian Hui Lin, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 609 days.

(21) Appl. No.: 15/730,556

(22) Filed: Oct. 11, 2017

(65) Prior Publication Data

US 2018/0108080 A1 Apr. 19, 2018
US 2018/0315115 A9 Nov. 1, 2018

(30) Foreign Application Priority Data

Oct. 14, 2016 (SG) .............................. 10201608646S

(51) Int. Cl.
*G06Q 30/00* (2012.01)
*G06Q 30/06* (2012.01)
*G06F 21/32* (2013.01)
*G06Q 30/02* (2012.01)
*G06T 19/00* (2011.01)
*H04L 29/06* (2006.01)

(52) U.S. Cl.
CPC ......... *G06Q 30/0643* (2013.01); *G06F 21/32* (2013.01); *G06Q 30/02* (2013.01); *G06T 19/006* (2013.01); *H04L 63/0861* (2013.01); *H04L 2463/102* (2013.01)

(58) Field of Classification Search
CPC .... G06F 21/32; G06Q 30/02; G06Q 30/0643; G06Q 20/208; G06Q 20/40145; G06Q 20/12; G06T 19/006; H04L 63/0861; H04L 2463/102; G07G 1/0063; G07G 1/0036; G07F 9/0235
USPC ..................................................... 705/26, 27
See application file for complete search history.

(56) References Cited

U.S. PATENT DOCUMENTS 8,606,645 B1 12/2013 Applefeld
8,626,611 B2 1/2014 Bravo
(Continued)

OTHER PUBLICATIONS

Hussain, Arifin:"How wearable biometric devices are changing individual identification," Arab News [Jeddah] Jan. 18, 2015; Dialog #1646246665, 4pgs. (Year: 2015).*

*Primary Examiner* — Robert M Pond
(74) *Attorney, Agent, or Firm* — Armstrong Teasdale LLP

(57) ABSTRACT

An augmented reality device and method for product purchase facilitation using an augmented reality device are provided. The device includes a display module configured to provide augmented reality visual content, the augmented reality visual content including a virtual image of a product, a biometric authentication module configured to receive biometric data relating to a user and authenticate the user based on the received biometric data, and a transceiver module configured to receive, from a user device, digital payment credentials for facilitating purchase of the product, and transmit the digital payment credentials to a payment processing module for product purchase upon successful authentication of the user.

20 Claims, 3 Drawing Sheets

(56) References Cited

U.S. PATENT DOCUMENTS

| | | |
|---|---|---|
| 8,866,847 B2 | 10/2014 | Bedi et al. |
| 9,153,074 B2 | 10/2015 | Zhou et al. |
| 9,224,166 B2 | 12/2015 | Calman et al. |
| 9,449,343 B2 | 9/2016 | Mayerle et al. |
| 9,477,852 B1 | 10/2016 | Neale et al. |
| 10,122,719 B1* | 11/2018 | Vltavsky ............... H04L 63/083 |
| 2008/0071559 A1 | 3/2008 | Arrasvuori |
| 2012/0192235 A1* | 7/2012 | Tapley ............... G06Q 30/0643 725/60 |
| 2013/0218721 A1* | 8/2013 | Borhan ............... G06Q 20/322 705/26.41 |
| 2013/0293530 A1 | 11/2013 | Perez et al. |
| 2014/0214547 A1 | 7/2014 | Signorelli et al. |
| 2014/0214600 A1 | 7/2014 | Argue et al. |
| 2014/0310056 A1 | 10/2014 | Alapati et al. |
| 2015/0309316 A1* | 10/2015 | Osterhout ............... G06F 1/163 345/8 |
| 2016/0117750 A1 | 4/2016 | Calman et al. |
| 2016/0171306 A1 | 6/2016 | Calman et al. |
| 2016/0180072 A1* | 6/2016 | Ligatti ................... G06F 21/34 726/7 |
| 2016/0189134 A1* | 6/2016 | Voege ................... G06Q 20/321 705/44 |
| 2017/0206691 A1 | 7/2017 | Harrises et al. |
| 2017/0270709 A1* | 9/2017 | Tran ....................... A43B 13/04 |
| 2017/0346634 A1* | 11/2017 | Hoyer ................... G06F 21/32 |
| 2018/0253840 A1* | 9/2018 | Tran ....................... G16H 50/30 |

* cited by examiner

AUGMENTED REALITY DEVICE AND METHOD FOR PRODUCT PURCHASE FACILITATION

CROSS REFERENCE TO RELATED APPLICATIONS

This patent application claims priority to Singapore Application No. 10201608646S filed on Oct. 14, 2016, the disclosure of which is incorporated by reference herein in its entirety as part of the present application.

BACKGROUND

The present disclosure relates broadly, but not exclusively, to an augmented reality device and a method for product purchase facilitation using an augmented reality device.

Augmented reality (AR) is a live direct or indirect view of a physical, real-world environment whose elements are augmented (or supplemented) by computer-generated sensory input such as sound, video, graphics, or GPS data. Augmentation is conventionally in real-time and in semantic context with environmental elements, such as sports scores on TV during a match. In other words, information about the environment and its objects is overlaid on the real world. Using advanced AR technology (e.g. adding computer vision and object recognition) information about the surrounding real world of the user can become interactive.

Currently, when consumers wish to purchase an article of clothing (jeans, shirt, shoes, etc.) they may try on the article (e.g. in an apparel merchant's fitting room) to see if the article fits and how it looks on the consumer. However, the queue at fitting rooms can be quite long especially during peak periods. Long waiting times at fitting rooms may discourage some consumers from purchasing products as they are not willing to queue up, potentially resulting in less revenue for merchants.

Currently, users may provide a non-confidential user identifier (e.g. a user ID) and a confidential personal identification number (PIN) to gain access to a system. In this way, the PIN is used to authenticate the user to the system. Upon receiving the user ID and PIN, the system retrieves a registered PIN (that is stored in the system) based on the user ID and compares the registered PIN with the received PIN. The user is granted access only if the received PIN matches the registered PIN number. PINs may be used at point of sale (POS) terminals for authenticating a cardholder during electronic payment transactions involving payment cards such as debit cards and credit cards. However, this method of authentication requires that the user remembers his PIN. If the user forgets his PIN, he would not be able to complete the transaction.

A need therefore exists to provide an augmented reality device and a method for product purchase facilitation using an augmented reality device that seek to address at least some of the above problems.

BRIEF DESCRIPTION

A first aspect of the present disclosure provides an augmented reality device for facilitating product purchase, including a display module configured to provide augmented reality visual content, the augmented reality visual content including a virtual image of a product, a biometric authentication module configured to receive biometric data relating to a user and authenticate the user based on the received biometric data, and a transceiver module configured to receive, from a user device, digital payment credentials for facilitating purchase of the product, and transmit the digital payment credentials to a payment processing module for product purchase upon successful authentication of the user.

The augmented reality device may further include a product identification module configured to determine product information relating to the product based on data encoded on a tag that is attached to the product. The transceiver module may be further configured to transmit at least a portion of the determined product information to the payment processing module for facilitating purchase of the product upon successful authentication of the user.

The product information may include a description and a price of the product, and the price of the product is transmitted to the payment processing module.

The display module may be further configured to display the description and the price of the product in conjunction with the augmented reality visual content.

The transceiver module may be further configured to receive a payment success message from the payment processing module upon successful payment of the product, and the display module may be further configured to display an indication of the payment success in conjunction with the augmented reality visual content upon receipt of the payment success message.

The biometric authentication module may be in communication with a biometric authentication directory server, and the received biometric data relating to the user is compared to reference biometric data stored in the biometric authentication directory server for authenticating the user.

The augmented reality device may be in communication with an inventory management system, and the transceiver module may be further configured to transmit a product release message to the inventory management system for release of the product upon receipt of the payment success message.

The augmented reality device may further include an input module configured to receive a purchase instruction from the user device to purchase the product, and the biometric authentication module may be configured to initiate authentication of the user upon receipt of the purchase instruction.

The input module may be further configured to obtain an image of the user, and the augmented reality visual content provided by the display module may include the image of the user in juxtaposition with the virtual image of a product.

The biometric data may include one or more of iris data, fingerprint data, voice data, and facial feature data.

A second aspect of the present disclosure provides a method for product purchase facilitation using an augmented reality device, the augmented reality device including a display module, a biometric authentication module, and a transceiver module, the method including the steps of: providing augmented reality visual content including a virtual image of a product using the display module, receiving biometric data relating to a user at the biometric authentication module, authenticating the user based on the received biometric data using the biometric authentication module, and receiving, at the transceiver module, digital payment credentials from a user device for facilitating purchase of the product, and transmitting the digital payment credentials from the transceiver module to a payment processing module for product purchase upon successful authentication of the user by the biometric authentication module.

The augmented reality device may further include a product identification module, and the method may further include determining, using the product identification module, product information relating to the product based on data encoded on a tag that is attached to the product, and transmitting, using the transceiver module, at least a portion of the determined product information to the payment processing module for facilitating purchase of the product upon successful authentication of the user.

The product information may include a description and a price of the product, and the price of the product is transmitted to the payment processing module.

The method may further include displaying, using the display module, the description and the price of the product in conjunction with the augmented reality visual content.

The method may further include receiving, at the transceiver module, a payment success message from the payment processing module upon successful payment of the product, and displaying, using the display module, an indication of the payment success in conjunction with the augmented reality visual content upon receipt of the payment success message.

The method may further include comparing the received biometric data relating to the user to reference biometric data stored in a biometric authentication directory server that is in communication with the biometric authentication module.

The method may further include transmitting, using the transceiver module, a product release message to an inventory management system that is in communication with the augmented reality device upon receipt of the payment success message.

The augmented reality device may further include an input module, and wherein the method may further include receiving, at the input module, a purchase instruction from the user device to purchase the product, and initiating authentication of the user by the biometric authentication module upon receipt of the purchase instruction.

The method may further include obtaining an image of the user using the input module, and displaying, using the display module, the augmented reality visual content including the image of the user in juxtaposition with the virtual image of a product.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

DETAILED DESCRIPTION

Figure 1:
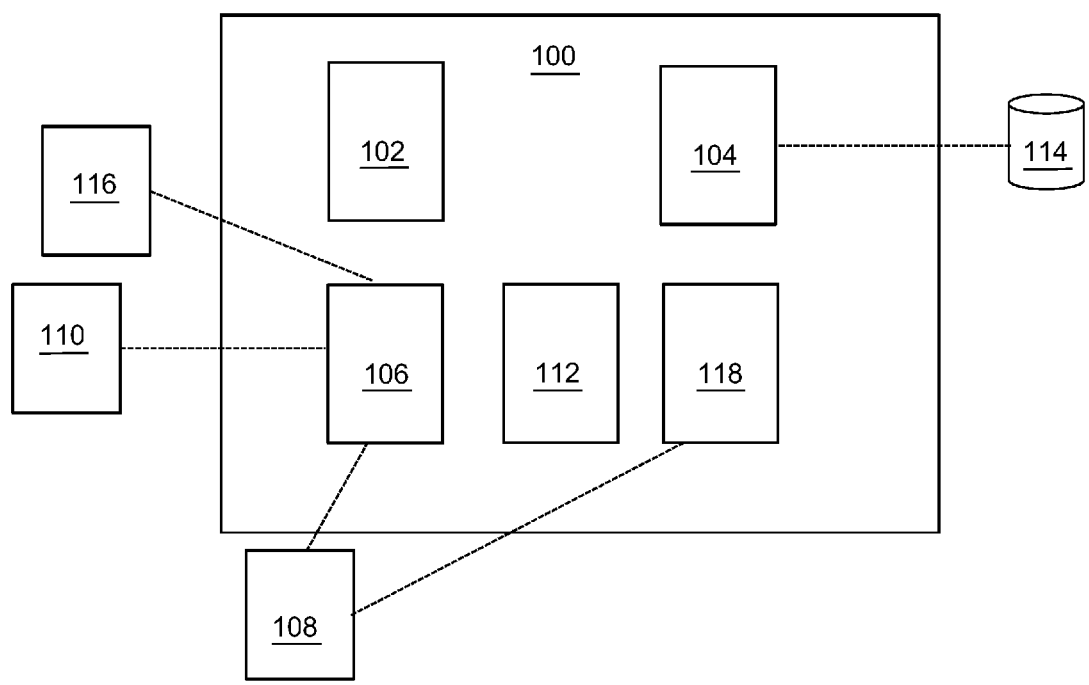
FIG. 1 is a schematic of an augmented reality device for facilitating purchase of a product according to an example embodiment.

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic, or optical signals capable of being stored, transferred, combined, compared, and otherwise manipulated.

Unless specifically stated otherwise, and as apparent from the following, it will be appreciated that throughout the present disclosure, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission, or display devices.

The present disclosure also provides apparatus for performing the operations of the methods. Such apparatus may be specially constructed for the required purposes, or may include a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present disclosure also implicitly provides a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the method.

FIG. 1 is a schematic of an augmented reality device 100 for facilitating purchase of a product, according to an embodiment. Where the context permits, singular (e.g. "product") or plural terms may also include the plural (e.g.

"products") or singular term, respectively. The augmented reality device 100 includes a display module 102 that is configured to provide augmented reality visual content. The augmented reality visual content includes a virtual image of a product. For example, if the product is a shirt, the augmented reality visual content includes a virtual image of the shirt having substantially similar attributes (e.g. color, shape, size, etc.) as the actual product. In the following description, the term "module" (e.g. display module, biometric authentication module, etc.) can refer to software, a hardware element, or a combination of both.

The display module 102 may include a display screen with a reflective surface so that a user who is positioned in front of the reflective surface may be able to see an image of himself/herself in juxtaposition with the virtual image of a product, may be in real-time and in semantic context. In other words, if the product is a shirt, the virtual image of the shirt is superimposed on the user's torso, and if the product is a hat, the virtual image of the hat is superimposed on top of the user's head. Instead of a reflective surface, an image capturing module may be used to capture an image of the user and the captured image (or a part thereof) is displayed on the display screen in conjunction with the virtual image of a product. The display module 102 may include an augmented reality processor (not shown in FIG. 1) that can generate the virtual images in juxtaposition with the image of the user may be in real-time and in semantic context.

The augmented reality device 100 further includes a biometric authentication module 104 configured to receive biometric data relating to a user. The biometric data may include one or more of iris data, fingerprint data, voice data, and facial feature data relating to the user. For example, the biometric authentication module 104 may include a biometric data such a fingerprint scanner for receiving the biometric data relating to the user. The biometric authentication module 104 is further configured to authenticate the user based on the received biometric data.

The biometric authentication module 104 may be in communication with a biometric authentication directory server 114. The biometric authentication directory server 114 may include a database with reference or template biometric data enrolled therein. The biometric authentication module 104 can authenticate the user based on the received biometric data by comparing the received biometric data relating to a user with the enrolled reference or template biometric data of the user. As shown in FIG. 1, the biometric authentication directory server 114 is an external module (i.e. not part of) the augmented reality device 100 and may be administered by a financial institution or payment network. However, the biometric authentication directory server 114 may be an internal module (i.e. part of/integrated within) the augmented reality device 100.

The augmented reality device 100 further includes a transceiver module 106 that is configured to receive digital payment credentials from a user device 108 for facilitating purchase of the product. The user device 108 may be a mobile device (e.g. smartphone or tablet computer) having installed therein a mobile (digital) wallet application. The mobile wallet application may be loaded with one or more payment cards, and is capable of securely administering the digital payment credentials of each payment card. The transceiver module 106 is further configured to transmit the digital payment credentials to a payment processing module 110 for product purchase upon successful authentication of the user by the biometric authentication module 104.

In an implementation, the augmented reality device 100 may further include a product identification module 112 configured to determine product information relating to the product based on data encoded on a tag that is attached to the product. The product information includes, but is not limited to, a description and a price of the product. For example, the tag may be a radio-frequency identification (RFID) tag that is attached to the product. The product identification module 112 may include a RFID scanner that is capable of reading the product information encoded on the RFID tag.

The transceiver module 106 may be further configured to transmit at least a portion of the determined product information (e.g. the price of the product) to the payment processing module 110 for facilitating purchase of the product upon successful authentication of the user by the biometric authentication module 104. For instance, with the price of the product, the payment processing module 110 can generate an instruction to debit the corresponding amount from the user's account.

In addition to the providing the augmented reality visual content, the display module 102 may be further configured to display the description and/or the price of the product in conjunction with the augmented reality visual content. Continuing from the example above, the display screen of the display module 102 can display the description and/or the price of the shirt in conjunction with the virtual image of the shirt that is superimposed on the user's torso.

In an implementation, the transceiver module 106 is further configured to receive a payment success message from the payment processing module 110 upon successful payment of the product. The display module 102 is further configured to display an indication of the payment success in conjunction with the augmented reality visual content upon receipt of the payment success message. Continuing from the example above, the display screen of the display module 102 can display the payment success message (e.g. "Payment Successful") in conjunction with the virtual image of the shirt that is superimposed on the user's torso. The payment processing module 110 can be configured to process transactions as known in the art, which includes handling and/or generating messages between acquiring banks, card scheme networks, and issuing banks.

In an implementation, the augmented reality device 100 is in communication with an inventory management system 116, and the transceiver module 106 is further configured to transmit a product release message to the inventory management system 116 for release of the product upon receipt of the payment success message. In this context, release of a product includes handing over the product to the user (at a physical store) and delivering the product to the user (for an online store). After releasing a product, the inventory management system 116 can update a product inventory so that stock can be monitored and replenished if necessary.

In an implementation, the augmented reality device 100 further includes an input module 118 configured to receive a purchase instruction from the user device 108 to purchase the product. The biometric authentication module 100 can be further configured to initiate authentication of the user upon receipt of the purchase instruction. In other words, the purchase instruction from the user acts as a trigger for authentication of the user.

The input module 118 may be further configured to obtain an image of the user. For example, the input module 118 may have an image capturing module as described above. The display module 102 can display the augmented reality visual content that includes the obtained image of the user (or a part thereof) in juxtaposition with the virtual image of a product.

The augmented reality device 100 may be placed in a merchant's store. Specifically, the augmented reality device 100 may replace a conventional mirror that is placed in a fitting room and placed in the open since a private enclosure is no longer required for customers to undress and try on articles of clothing. In other words, customers can utilize the augmented reality device 100 to try on articles of clothing in public as a virtual image of the article of clothing is provided in juxtaposition with an image of the user on a reflective surface (mirror) or display screen as described above. This advantageously minimizes waiting times at conventional fitting rooms. Furthermore, waiting times at conventional cashiers can also be minimized as payment can be done at the augmented reality device 100 based on biometric authentication of the cardholder. Purchased items can be collected at a separate counter or delivered directly to a consumer's home. The augmented reality device 100 may be configured to allow the user to select multiple products to try on sequentially or simultaneously, and the user can select which virtual item(s) to be displayed in juxtaposition with the image of the user.

Besides implementations for on-site retail shopping, embodiments may also be implemented for off-site retail shopping. For instance, the embodiments described above can be used for mobile shopping (where a consumer has an augmented reality enabled smartphone that can provide, among other things, an image of the user in juxtaposition with a virtual image of a product) and smart television shopping (where a consumer has an augmented reality enabled television that can provide, among other things, an image of the user in juxtaposition with a virtual image of a product). Embodiments may also be implemented for in-game shopping (where users are able to purchase in-game items when playing games using an augmented reality enabled game console). Embodiments described above can also be used in vehicles where an augmented reality enabled rear-view mirror can be used to make purchases when a car is stationary (e.g. paying for petrol at a petrol station and the value of the petrol is displayed on the mirror).

Figure 2:
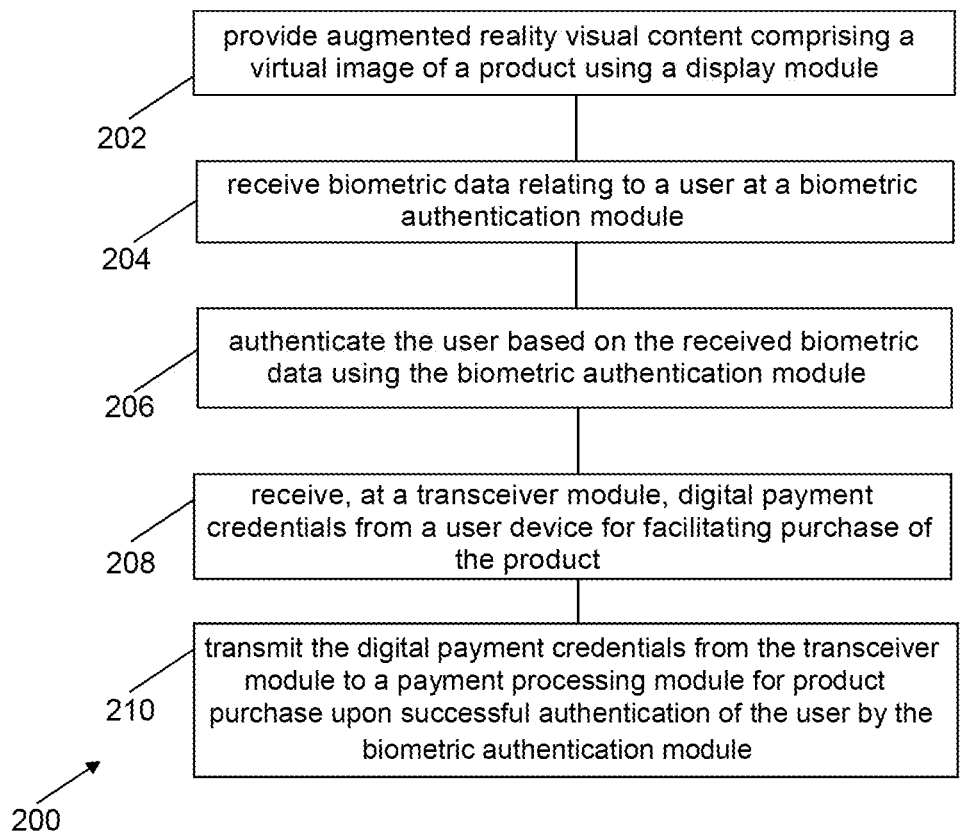
FIG. 2 is a flowchart illustrating a method for product purchase facilitation using an augmented reality device, according to an example embodiment.

FIG. 2 is a flowchart 200 illustrating a method for product purchase facilitation using an augmented reality device, according to an example embodiment. The augmented reality device includes a display module, a biometric authentication module, and a transceiver module, substantially as described above. Step 202 involves providing augmented reality visual content including a virtual image of a product using the display module. Step 204 involves receiving biometric data relating to a user at the biometric authentication module.

At step 206, the user is authenticated based on the received biometric data (at step 204) using the biometric authentication module. For example, the received biometric data relating to the user is compared to reference biometric data stored in a biometric authentication directory server that is in communication with the biometric authentication module. The augmented reality device may include an input module and the method may further include receiving, at the input module, a purchase instruction from the user device to purchase the product, and initiating authentication of the user (i.e. step 206) by the biometric authentication module upon receipt of the purchase instruction.

The method may further include obtaining an image of the user using the input module, and displaying, using the display module, the augmented reality visual content including the image of the user in juxtaposition with the virtual image of a product.

At step 208, digital payment credentials for facilitating purchase of the product are received at the transceiver module from a user device (e.g. a smartphone or tablet computer having installed therein a mobile (digital) wallet application). At step 210, the digital payment credentials received at step 208 are transmitted from the transceiver module to a payment processing module for product purchase upon successful authentication of the user by the biometric authentication module.

The augmented reality device may further include a product identification module and the method may further include determining, using the product identification module, product information relating to the product based on data encoded on a tag that is attached to the product. The product information includes a description and a price of the product. The method may also include transmitting, using the transceiver module, at least a portion of the determined product information (e.g. the price of the product) to the payment processing module for facilitating purchase of the product upon successful authentication of the user. The method may further include displaying, using the display module, the description and the price of the product in conjunction with the augmented reality visual content.

The method may also include receiving, at the transceiver module, a payment success message from the payment processing module upon successful payment of the product, and displaying, using the display module, an indication of the payment success in conjunction with the augmented reality visual content upon receipt of the payment success message. Further, a product release message may be transmitted by the transceiver module to an inventory management system that is in communication with the augmented reality device upon receipt of the payment success message.

Prior to step 204 and potentially prior to step 202, the method may include a setup step (not shown in FIG. 2) which involves the user pairing his user device (having a digital wallet application) with the augmented reality device, e.g. via Bluetooth (BLE) connection. The setup step may be performed once and does not need to be repeated for every purchase of products.

Figure 3:
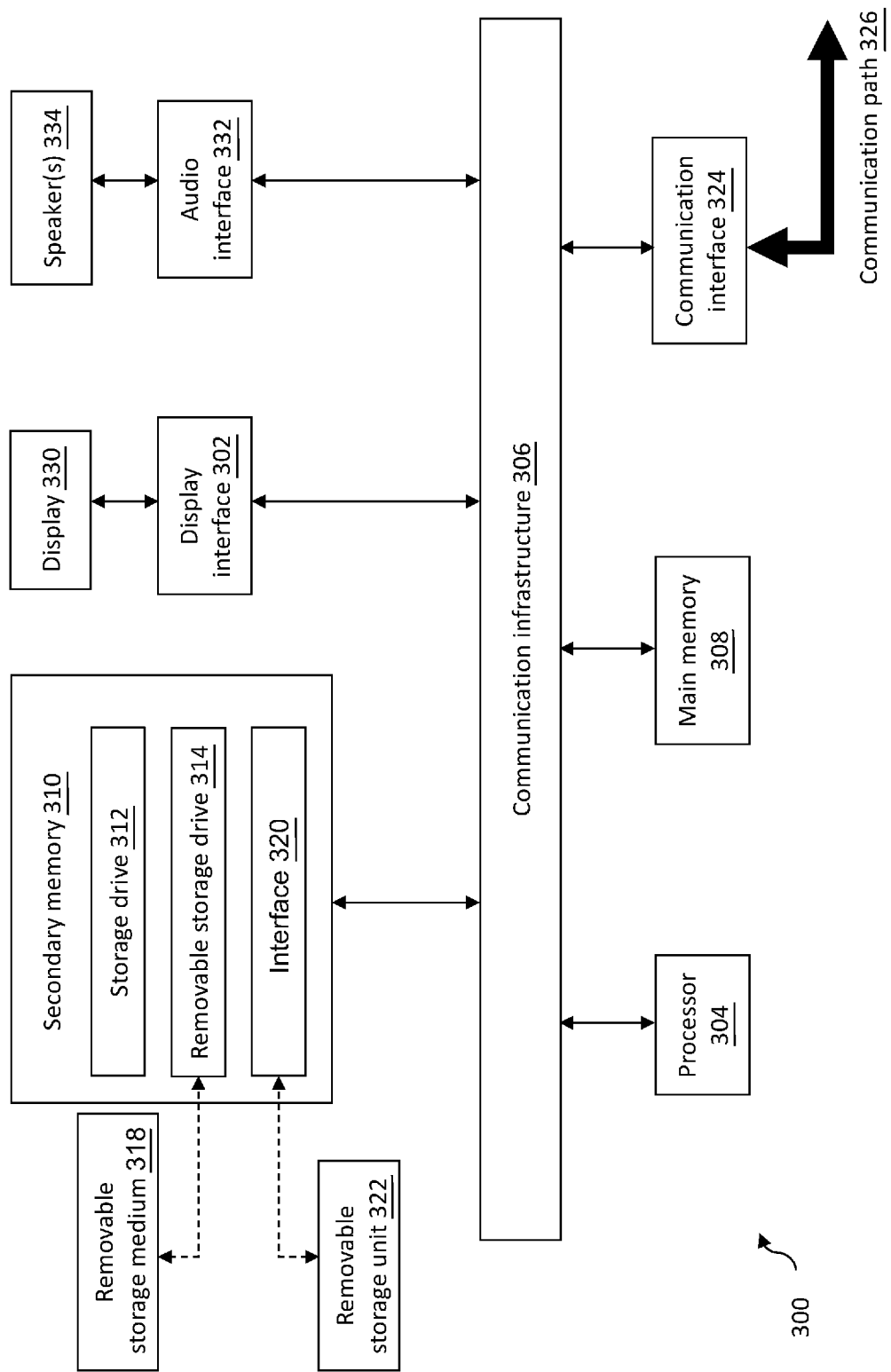
FIG. 3 shows a schematic diagram of a computer system suitable for use in executing at least some steps of the method for product purchase facilitation or for realizing at least a part of the augmented reality device.

FIG. 3 shows a schematic diagram of a computer device/system 300 suitable for use in executing at least some steps of the method for product purchase facilitation or for realizing at least a part of the augmented reality device. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a hard disk drive 312 and/or a removable storage drive 314, which may include a magnetic tape drive, an optical disk drive, or the like. The removable storage drive 314 reads from and/or writes to a removable storage unit 318 in a well-known manner. The removable storage unit 318 may include a magnetic tape, optical disk, or the like, which is read by and written to by removable storage drive 314. As will be appreciated by persons skilled in the relevant art(s), the removable storage unit 318 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 320. Examples of a removable storage unit 322 and interface 320 include a removable memory chip (such as an EPROM or PROM) and associated socket, and other removable storage units 322 and interfaces 320 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the disclosure, the communication interface 324 permits data to be transferred between the computing device 300 and a data communication network, such as a public data or private data communication network. The communication interface 324 may be used to exchange data between different computing devices 300 which such computing devices 300 form part an interconnected computer network. Examples of a communication interface 324 can include a modem, a network interface (such as an Ethernet card), a communication port, an antenna with associated circuitry and the like. The communication interface 324 may be wired or may be wireless. Software and data transferred via the communication interface 324 are in the form of signals which can be electronic, electromagnetic, optical, or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage unit 318, removable storage unit 322, a hard disk installed in hard disk drive 312, or a carrier wave carrying software over communication path 326 (wireless link or cable) to communication interface 324. Computer readable storage media refers to any non-transitory tangible storage medium that provides recorded instructions and/or data to the computing device 300 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the hard disk drive 312, or the interface 320. Alternatively, the computer program product may be downloaded to the computer system 300 over the communications path 326. The software, when executed by the processor 304, causes the computing device 300 to perform functions of embodiments described herein.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

What is claimed is:

1. An augmented reality device for facilitating a product purchase, comprising: at least one processor coupled to at least one memory device including computer-executable instructions when executed by the at least one processor, the instructions cause the at least one processor to execute:
   a display module configured to provide augmented reality visual content, the augmented reality visual content comprising a virtual image of a product superimposed on a physical environment of a user of the augmented reality device to create the augmented reality visual content;
   an input module configured to receive, from a user device paired to the augmented reality device, a purchase instruction to purchase the product, the purchase instruction triggering an authentication of the user;
   a biometric authentication module configured to i) receive biometric data relating to the user and ii) authenticate the user based on the received biometric data; and
   a transceiver module configured to:
      pair, via wireless communication, with the user device associated with the user to enable data exchange between the augmented reality device and the user device;
      receive, from the user device via the paired wireless communication, digital payment credentials for facilitating purchase of the product; and
      in response to receiving the digital payment credentials and upon successful authentication of the user, transmit the digital payment credentials to a payment processing module for processing a purchase transaction associated with the product.

2. The augmented reality device according to claim 1, further comprising a product identification module configured to determine product information relating to the product based on data encoded on a tag that is attached to the product, wherein the transceiver module is further configured to transmit at least a portion of the determined product information to the payment processing module for facilitating purchase of the product upon successful authentication of the user.

3. The augmented reality device according to claim 2, wherein the product information comprises a description and a price of the product, and wherein the price of the product is transmitted to the payment processing module.

4. The augmented reality device according to claim 3, wherein the display module is further configured to display the description and the price of the product in conjunction with the augmented reality visual content.

5. The augmented reality device according to claim 1, wherein the transceiver module is further configured to receive a payment success message from the payment processing module upon successful payment for the product, and wherein the display module is further configured to display an indication of the successful payment in conjunction with the augmented reality visual content upon receipt of the payment success message.

6. The augmented reality device according to claim 5, wherein the augmented reality device is in communication with an inventory management system, and wherein the transceiver module is further configured to transmit a product release message to the inventory management system for release of the product upon receipt of the payment success message.

7. The augmented reality device according to claim 1, wherein the biometric authentication module is in communication with a biometric authentication directory server, and wherein the received biometric data relating to the user is compared to reference biometric data stored in the biometric authentication directory server to authenticate the user.

8. The augmented reality device according to claim 1, wherein the input module is further configured to obtain an image of the user, and wherein the augmented reality visual content provided by the display module comprises the image of the user in juxtaposition with the virtual image of the product.

9. The augmented reality device according to claim 1, wherein the biometric data comprises at least one of iris data, fingerprint data, voice data, and facial feature data.

10. The augmented reality device according to claim 1, wherein:
the input module is further configured to obtain an image of the user from an image capture module and receive, from the user, a selection of one or more items; and
The display module is further configured to display, in juxtaposition with the captured image of the user, one or more virtual images of the one or more items.

11. A method for product purchase facilitation using an augmented reality device, the augmented reality device comprising at least one processor coupled to at least one memory device, a display module, an input module, a biometric authentication module, and a transceiver module, the method comprising:
providing augmented reality visual content comprising a virtual image of a product using the display module, the virtual image of the product superimposed on a physical environment of a user of the augmented reality device to create the augmented reality visual content;
receiving biometric data relating to the user at the biometric authentication module;
pairing, via wireless communication, the transceiver module with a user device associated with the user to enable data exchange between the augmented reality device and the user device;
receiving, from the user device paired to the augmented reality device, a purchase instruction to purchase the product, the purchase instruction triggering authenticating the user based on the received biometric data using the biometric authentication module; and
receiving, at the transceiver module from the user device via the paired wireless communication, digital payment credentials for facilitating purchase of the product; and
in response to receiving the digital payment credentials and upon successful authentication of the user, transmitting the digital payment credentials from the transceiver module to a payment processing module for processing a purchase transaction associated with the product.

12. The method according to claim 11, wherein the augmented reality device further comprises a product identification module, and wherein the method further comprises:
determining, using the product identification module, product information relating to the product based on data encoded on a tag that is attached to the product; and
transmitting, using the transceiver module, at least a portion of the determined product information to the payment processing module for facilitating purchase of the product upon successful authentication of the user.

13. The method according to claim 12, wherein the product information comprises a description and a price of the product, and wherein the price of the product is transmitted to the payment processing module.

14. The method according to claim 13, further comprising displaying, using the display module, the description and the price of the product in conjunction with the augmented reality visual content.

15. The method according to claim 11, further comprising:
receiving, at the transceiver module, a payment success message from the payment processing module upon successful payment for the product; and
displaying, using the display module, an indication of the successful payment in conjunction with the augmented reality visual content upon receipt of the payment success message.

16. The method according to claim 15, further comprising transmitting, using the transceiver module, a product release message to an inventory management system that is in communication with the augmented reality device upon receipt of the payment success message.

17. The method according to claim 11, further comprising comparing the received biometric data relating to the user to reference biometric data stored in a biometric authentication directory server that is in communication with the biometric authentication module.

18. The method according to claim 11, further comprising:
obtaining an image of the user using the input module; and
displaying, using the display module, the augmented reality visual content comprising the image of the user in juxtaposition with the virtual image of the product.

19. The method according to claim 11, wherein the biometric data comprises at least one of iris data, fingerprint data, voice data, and facial feature data.

20. The method according to claim 11 further comprising:
obtaining, from an image capture module, an image of the user;

receiving, from the user via the input module, a selection of one or more items; and displaying, by the display module in juxtaposition with the captured image of the user, one or more virtual images of the one or more items.

\* \* \* \* \*